United States Patent [19]
Hung

[11] Patent Number: 6,130,382
[45] Date of Patent: Oct. 10, 2000

[54] STRUCTURE OF A MONITOR FILTER

[75] Inventor: Teng-Shun Hung, O.O. Box 82-144, Taipei, Taiwan

[73] Assignees: Teng-Shun Hung; Data Assessories Corporation, both of Taipei, Taiwan

[21] Appl. No.: 09/201,179

[22] Filed: Nov. 30, 1998

[51] Int. Cl.[7] ..................................................... H05K 9/00
[52] U.S. Cl. ....................................... 174/35 R; 292/353
[58] Field of Search .................................. 174/52.1, 35 R; 83/840; 351/126; 292/353; 358/247; 24/585; 248/231.41; 348/819

[56] References Cited

U.S. PATENT DOCUMENTS

| | | | |
|---|---|---|---|
| 4,381,421 | 4/1983 | Coats et al. ............................ | 174/35 R |
| 5,122,619 | 6/1992 | Dlubak ................................... | 174/35 R |
| 5,822,918 | 10/1998 | Helfman et al. ............................ | 47/39 |

Primary Examiner—William A. Cuchlinski, Jr.
Assistant Examiner—Ronnie Mancho
Attorney, Agent, or Firm—A & J

[57] ABSTRACT

An improvement in the structure of a monitor filter includes a generally rectangular primary frame having an inverted L-shaped cross section, four brackets at four corners each provided with a spring-loaded ball, a pair of secondary frames slidably engaged with two sides of the primary frame, each of the secondary frames being provided with two lugs each having a horizontal slot formed with a plurality of teeth engageable with the ball, and an anti-radiation screen mounted on the primary frame by a rectangular member, whereby the secondary frames can slide in or out of the primary frame to adapt for use with monitors of different sizes.

1 Claim, 3 Drawing Sheets

STRUCTURE OF A MONITOR FILTER

BACKGROUND OF THE INVENTION

1. Field of the Invention

This invention is related to an improvement in the structure of a monitor filter.

2. Description of the Prior Art

It has been found that glare, reflection and static induction will be produced when a monitor is in use. The glare and the reflection will damage the eyesight while the static induction will hurt both the eyesight and the face skin of the operator. Hence, a number of monitor filters have been developed to reduce glare, reflection and static induction. However, the commonly used monitor filter on the market still suffers from the following drawbacks:

1. The frame of the monitor filter is fixed and only designed for use with a certain type of monitor thereby making it unfit for use with monitors of different sizes.
2. As the monitor filter is only designed for use with a certain type of monitor, the manufacturer must produce a number of different monitor filters to meet the needs of the market thus increasing the costs in manufacture and management.

Therefore, it is an object of the present invention to provide an improved monitor filter which can obviate and mitigate the above-mentioned drawback.

SUMMARY OF THE INVENTION

This invention is related to an improvement in the structure of a monitor filter.

According to a preferred embodiment of the present invention, an improved monitor filter includes a generally rectangular primary frame having an inverted L-shaped cross section, four brackets at four corners each provided with a spring-loaded ball, a pair of secondary frames slidably engaged with two sides of the primary frame, each of the secondary frames being provided with two lugs each having a horizontal slot formed with a plurality of teeth engageable with the ball, and an anti-radiation screen mounted on the primary frame by a rectangular member, whereby the secondary frames can slide in or out of the primary frame to adapt for use with monitors of different sizes.

It is the primary object of the present invention to provide an improved monitor filter which can be adapted for use with monitors of different sizes.

It is another object of the present invention to provide an improved monitor filter which is easy to assemble.

It is still another object of the present invention to provide an improved monitor filter which is simple in construction.

It is still another object of the present invention to provide an improved monitor filter which is convenient to use.

It is a further object of the present invention to provide an improved monitor filter which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 3A is an enlarged fragmentary view of FIG. 3;

DETAILED DESCRIPTION OF THE PREFERRED EMBODIMENT

Figure 2:
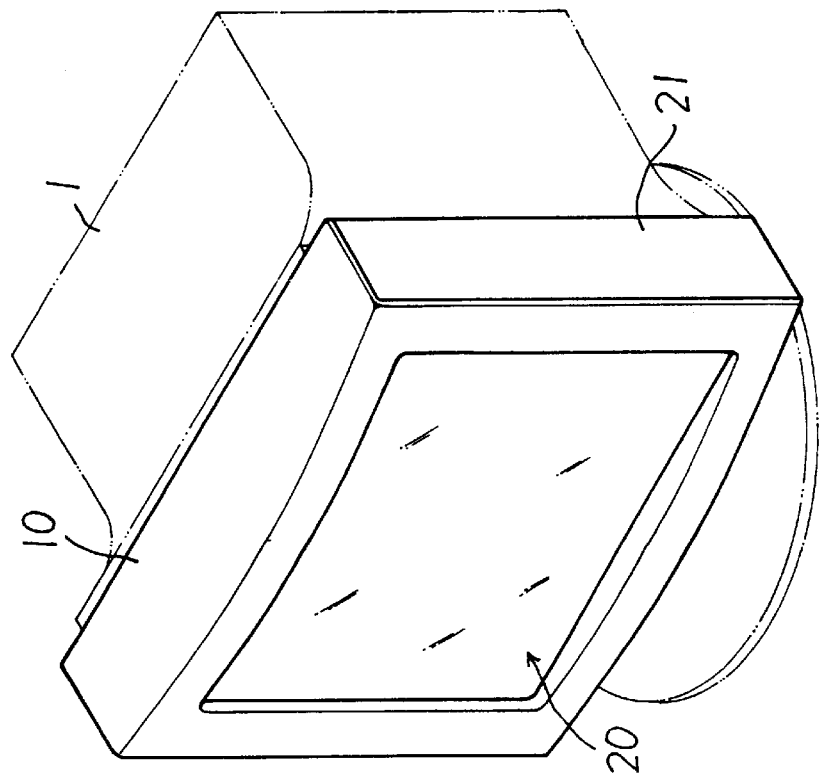
FIG. 2 is a working view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
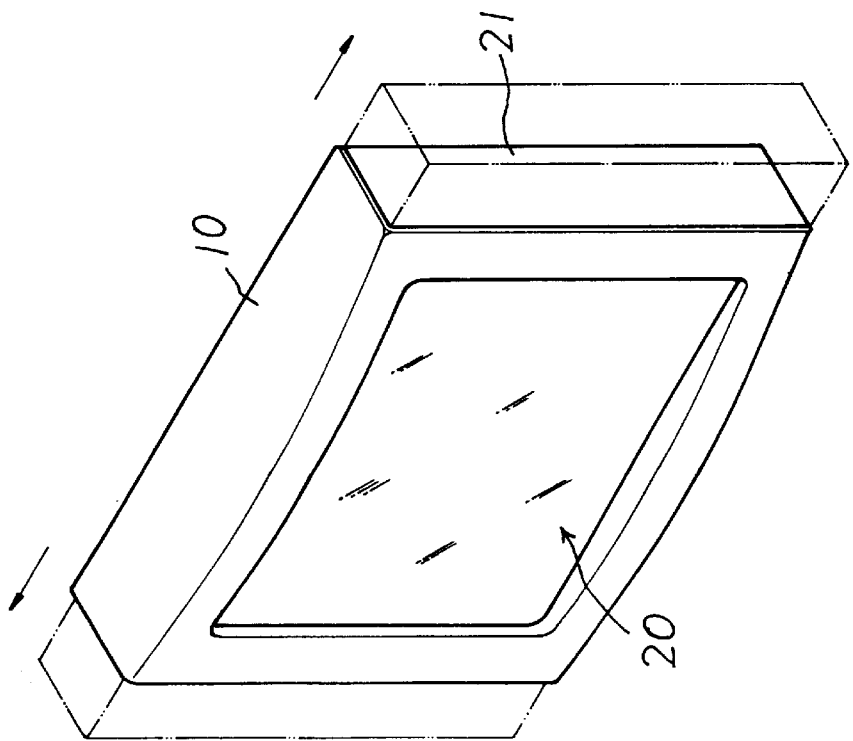
FIG. 1 is a perspective view of the present invention.
Figure 3:
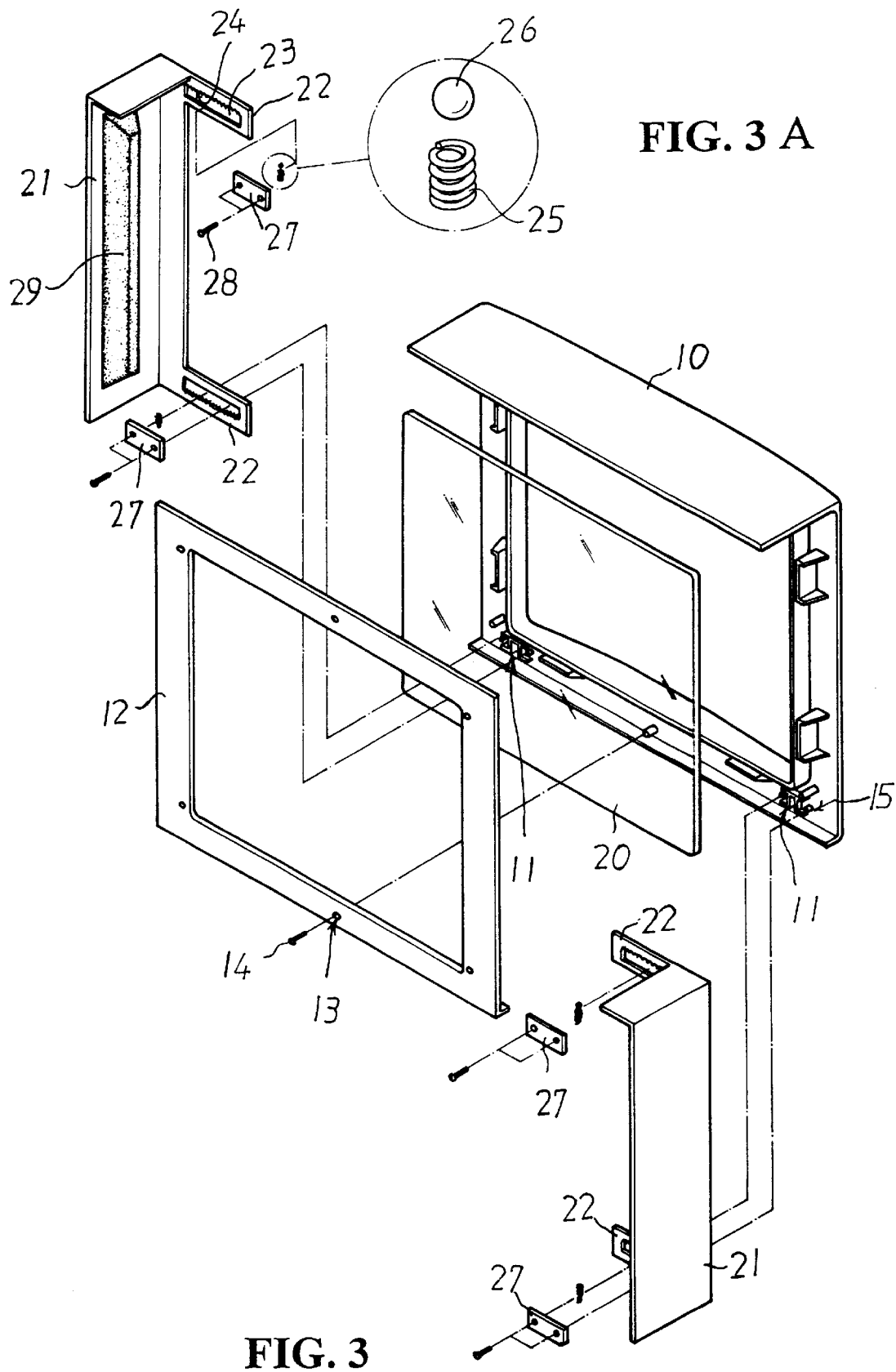
FIG. 3 is an exploded view of the present invention.

With reference to the drawings and in particular to FIGS. 1, 2 and 3 thereof, the monitor filter according to the present invention generally comprises a primary frame 10, an anti-radiation screen 20 and two secondary frames 21.

Figure 4:
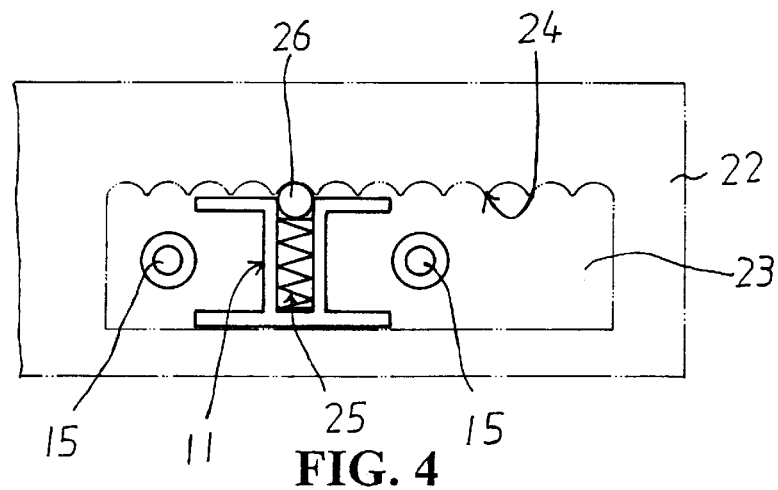
FIGS. 4, 5 and 6 illustrate the working principle of the present invention.

The primary frame 10 is a generally rectangular member with an inverted L-shaped cross section. The top 101 of the primary frame 10 is used for hanging on the monitor 1. Each corner of the inner side of the primary frame 10 is provided with a bracket 11 and two tubular portions 15 at two sides of the bracket 11. The bracket 11 at the upper corner has a vertical cavity 111 (see FIG. 4) open at the top, while the bracket at the lower corner has a vertical cavity 111 open at the bottom (see FIG. 3). A spring 25 is first fitted in each cavity 111 and a ball 66 is arranged on the upper end of the spring 25 (see FIGS. 3A and 4).

Figure 5:
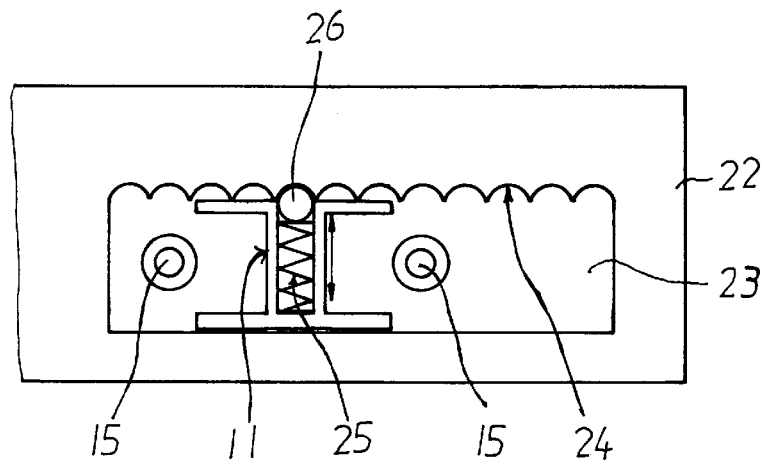
Figure 6:
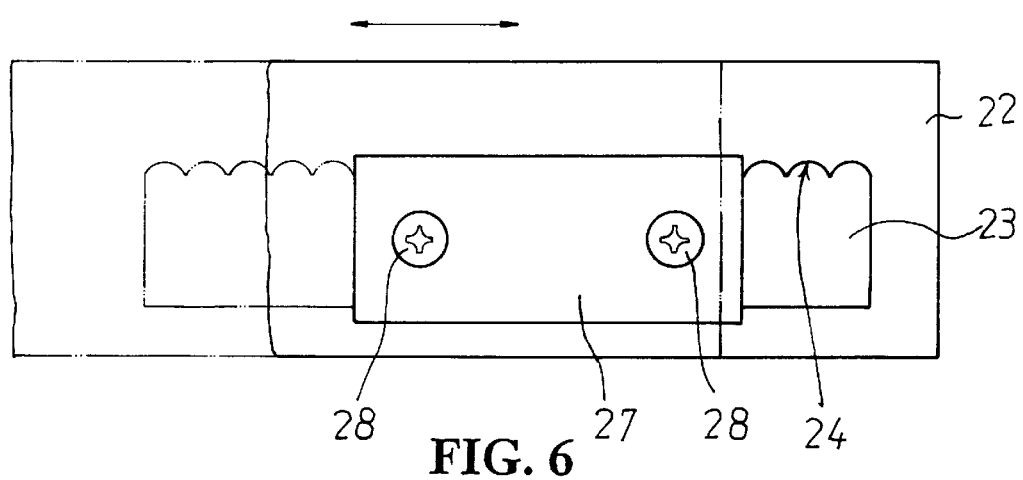

The secondary frame 21 is provided with two lugs 22 each extending horizontally from the upper and lower ends thereof. The lug 22 at the upper end of the secondary frame 21 has a horizontal slot 23 formed with a plurality of teeth 24 at the upper side thereof engageable with the ball 26 (see FIG. 5). Similarly, the lug 22 at the lower end of the secondary frame 21 has a horizontal slot 23 formed with a plurality of teeth 24 at the lower side thereof engageable with the ball 26. The secondary frame 21 is mounted on the primary frame 10 by first engaging the horizontal slots 23 with the corresponding brackets 11 and then securing a fixing plate 27 to the bracket 11 by extending screws 28 through the fixing plate 27 into the tubular portions 15 (see FIG. 6), so that the secondary frame 21 can slide in or out of the primary frame 10 as required. The ball 26 is used for keeping the secondary frame 21 at a desired position. The inner side of the secondary frame 21 is provided with an elongated resilient member 29.

The anti-radiation screen 20 is kept in place by mounting a rectangular member 12 on the anti-radiation screen 20 and then extending screws 14 through the holes 13 into the inner side of the primary frame 10.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A monitor filter comprising:
   a generally rectangular primary frame having an inverted L-shaped cross section, said primary frame having an inner side having four corners each provided with a bracket and two tubular portions at two sides of said bracket, said bracket at upper corner of said primary frame having a vertical cavity open at a top thereof, said bracket at a lower corner of said primary frame having a vertical cavity open at a bottom thereof, a spring fitted in each of said cavities and a ball arranged on an upper end of said spring;

a pair of secondary frames each provided with two lugs each extending horizontally from upper and lower ends thereof, each of said lugs at an upper end of said secondary frames having a horizontal slot formed with a plurality of teeth at said upper side thereof engageable with said ball, each of said lugs at a lower end of said secondary frames having said horizontal slot formed with a plurality of teeth at a lower side thereof engageable with said ball, said secondary frames being mounted on two sides of said primary frame by first engaging said horizontal slot with a respective one of said brackets and then securing a fixing plate to said respective one of said brackets by extending screws through said fixing plate into said tubular portions; and an anti-radiation screen kept in place by mounting a rectangular member on said screen and then extending screws through said rectangular member into said primary frame.

* * * * *